United States Patent
König et al.

(10) Patent No.: US 10,530,500 B2
(45) Date of Patent: Jan. 7, 2020

(54) MEASUREMENT SYSTEM AND MEASUREMENT METHOD

(71) Applicant: Rohde & Schwarz GmbH & Co. KG, München (DE)

(72) Inventors: Michael König, München (DE); Daniel Markert, Deggendorf (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 16/015,917

(22) Filed: Jun. 22, 2018

(65) Prior Publication Data

US 2019/0334638 A1    Oct. 31, 2019

Related U.S. Application Data

(63) Continuation-in-part of application No. 15/962,014, filed on Apr. 25, 2018.

(51) Int. Cl.
| | |
|---|---|
| *H04B 17/23* | (2015.01) |
| *H04W 24/10* | (2009.01) |
| *H04W 24/08* | (2009.01) |
| *H04B 17/30* | (2015.01) |
| *H04W 88/08* | (2009.01) |
| *H04B 1/18* | (2006.01) |
| *H04W 92/20* | (2009.01) |

(52) U.S. Cl.
CPC ........... *H04B 17/23* (2015.01); *H04B 1/18* (2013.01); *H04B 17/30* (2015.01); *H04W 24/08* (2013.01); *H04W 24/10* (2013.01); *H04W 88/08* (2013.01); *H04W 92/20* (2013.01)

(58) Field of Classification Search
CPC ...... H04B 1/005; H04B 1/406; H04B 7/0613; H04B 1/0475; H04B 2001/0418; H04L 25/03834
See application file for complete search history.

(56) References Cited

U.S. PATENT DOCUMENTS

| | | | |
|---|---|---|---|
| 6,631,174 B1 * | 10/2003 | Asahara | H04L 27/2273 375/324 |
| 2004/0166817 A1 | 8/2004 | Mokhtari et al. | |
| 2009/0080429 A1 * | 3/2009 | Iraninejad | H04L 49/90 370/392 |

(Continued)

FOREIGN PATENT DOCUMENTS

EP     2 985 910 A1    2/2016

OTHER PUBLICATIONS

Non-Final Rejection for U.S. Appl. No. 15/962,014, dated Jun. 13, 2019, 11 pages.

(Continued)

*Primary Examiner* — Sung S Ahn
(74) *Attorney, Agent, or Firm* — Westman, Champlin & Koehler, P.A.

(57) ABSTRACT

The present invention relates to a modular and flexible measurement of radio-frequency signals. For this purpose, the measurement system is separated into a connection device performing digital operations and a radio-frequency signals comprising analogue circuits. The connection device and the radio-frequency device are coupled with each other by appropriate interfaces for exchanging signals, in particular digital signals between the communication device and the radio-frequency device.

17 Claims, 3 Drawing Sheets

(56) References Cited

U.S. PATENT DOCUMENTS

2010/0177760 A1    7/2010   Cannon et al.
2014/0016583 A1*   1/2014   Smith .................. H04W 12/06
                                                                        370/329
2017/0005677 A1*   1/2017   Petrovic ............... H04B 1/0475

OTHER PUBLICATIONS

Markert, Daniel et al., "An All-Digital, Single-Bit RF Transmitter for Massive MIMO", IEEE Transactions on Circuits and Systems-I: Regular Papers, vol. 64, No. 3, Mar. 2017, 9 pages.

* cited by examiner

MEASUREMENT SYSTEM AND MEASUREMENT METHOD

CROSS-REFERENCE TO RELATED APPLICATIONS

This application is a continuation-in-part of U.S. application Ser. No. 15/962,014, filed on Apr. 25, 2018, the contents of which are incorporated herein by reference.

TECHNICAL FIELD

The present invention relates to a measurement apparatus. The present invention further relates to a measurement method. In particular, the present invention relates to a measurement of radio-frequency signals.

BACKGROUND

Although applicable in principal to any kind of radio frequency measurement, the present invention and its underlying problem will be hereinafter described in combination with testing of wireless devices.

The use of wireless communication systems for communication between electronic device increases continually with the advance of high-speed wireless data communications.

During development or production of devices for such communication systems it is necessary to perform multiple tests, e.g. tests the devices for compliance with communication standards and legal regulations. For this purpose, the test device have to be adapted to the required tests.

Depending on the test scenario and the communication properties of the device under test, many different test the devices have to be used. Each separate test device requires huge amount of space and courses high costs.

Against this background, the problem addressed by the present invention is to provide a simple and versatile measurement system which can be easily adapted to multiple different areas of application. In particular, the present invention aims to provide a test arrangement which enables a simple and efficient use of multiple devices into a wireless of radio frequency measurement.

SUMMARY

The present invention solves this problem by the features of the independent claims. Further embodiments are subject matter of the dependent claims.

Accordingly to a first aspect, a measurement system for measuring radio frequency signals is provided. The measurement system comprises a connection device and the radio-frequency device. The connection device includes a first interface and a processing unit. The processing unit is adapted to generate a digital output signal relating to a desired radio frequency signal and to provide the generated digital output signal to the first interface, or to generate a digital input signal relating to an analog input signal the received at the first interface. The radio frequency device includes a second interface for directly connecting with the first interface of the connection device. In particular, the second interface is adapted to receive the digital output signal provided by the first interface of the connection device and to output a radio frequency signal based on the received digital output signal, or to measure a radio frequency measurement signal and to output an analog signal to the second interface. The analog signal is forwarded to the first interface of the connection device as the analog input signal.

According to a second aspect, a measurement method for measuring radio frequency signals is provided. The method comprises generating a digital output signal relating to a desired radio frequency signal by a processing unit of a communication device; providing the generated digital output signal to a first interface of the communication device; receiving the digital output signal from the first interface of the communication device by a second interface of a radio-frequency device, wherein the second interface is directly coupled with the first interface; and outputting a radio frequency signal based on the received digital output data by the radio-frequency device.

According to a third aspect, a further measurement method for measuring radio-frequency signals is provided. The measurement method comprises measuring a radio-frequency measurement signal by a radio-frequency device; outputting an analogue signal relating to the measured radio frequency measurement signal by a second interface of the radio-frequency device; receiving the analogue signal by a first interface of a connection device, wherein said first interface is directly connected to the second interface; and generating a digital input signal relating to the received analogue signal by a processing unit of the connection device.

The present invention is based on the fact that measuring radio-frequency applications, e.g. for testing wireless devices requires the use of multiple different test devices. Each separate the device requires separate space and causes high costs. For this purpose, a versatile and flexible measurement equipment is required which enables a smart and efficient combination of multiple devices for radio-frequency applications.

Accordingly, the present invention provides a smart and efficient measurement equipment, which provides a flexible configuration for different devices for receiving/emitting the radio-frequency signals and for connecting the equipment to further, external devices. For this purpose, it is a particular approach of the present invention to use separate devices for analogue circuits and for digital processing of the radio-frequency signals. The two separate devices, i.e. the digital processing and the analogue circuits, are connected with each other by appropriate interfaces, in particular by digital interfaces. Hence, the radio-frequency signals are generated in a digital domain and the digital output is provided via digital interfaces to the analogue circuits. The other way around, the signals of the analogue circuits are also provided to the digital signal processing via digital interfaces. In other words, the digital device and the analogue circuit are connected with each other by digital interfaces. In particular, a direct connection, i.e. a connection without an additional cable, is used for connecting the digital device and the analogue circuit.

In this way, a same connection device for performing the digital processing of the radio-frequency signals may be used for multiple purposes. By connecting different radio-frequency devices to one and the same connection device, the measurement system may be adapted for multiple different radio-frequency applications. Furthermore, using the same connection device for multiple applications, and only changing the radio-frequency device, the total costs for performing the radio-frequency measurements can be reduced. Additionally, by using always the same connection device, the volume, i.e. the space, required for the components for the measurements can be also reduced. Finally, a connection of the connection devices to further devices, for example for a further processing of the measurement results, is always the same. Consequently, it is not necessary to perform any modifications with this respect. Hence, the time for adapting the measurement equipment can be reduced.

In particular, multiple radio-frequency signals can be generated or measured by separate radio frequency devices, wherein the same connection device is maintained and only a radio-frequency device is replaced by another radio-frequency device. Thus, the signal generation and the measurement of radio frequency signals can be easily adapted to multiple different test scenarios. In particular, only a single connection device is necessary which reduces the amount of required space and furthermore, the total costs for performing all the test can be minimized.

Furthermore, the digital data, especially data provided to the radio-frequency device by the connection device, may be processed by a spatial separated device and provided to the signal generation devices via a digital communication network. In this way, a centralized generation of the digital data, in particular of the digital data relating to the baseband of signal, can be achieved. In this way, any appropriate device for computing the required digital baseband data may be used. Since the computation of the digital baseband data can be performed separately from the generation of the radio frequency signals, the devices for generating radio-frequency signals can be simplified. Hence, the devices for generating radio-frequency signals may be smaller, cheaper and even more reliable.

Accordingly, the measurement system of the present invention is separated into a digital part realized by the connection device, and an analogue part of realized by the radio-frequency device. The two components are connected with each other by predetermined interfaces, in particular digital interfaces, wherein no wires or cables are used between the interface of the connection device and the corresponding interface of the radio-frequency device. In particular, the radio-frequency signals are provided by the connection device to the radio-frequency device as digital signals, and the digital signals are directly used by the analogue circuit of the radio-frequency device.

The interfaces for connecting the connection device and the radio-frequency device many any kind of appropriate interface. For example, the interface may comprise a predetermined number of at least two connectors for connecting the connection device and the radio-frequency device. In this way, the connection device and the radio-frequency device can be electrically coupled with each other. Furthermore, the interface may provide appropriate means for mechanically coupling the connection device and the radio-frequency device. In this way, the connection devised and the radio-frequency device can be arranged at a predetermined spatial relationship with respect to each other.

The processing unit of the connection device may receive the digital data and perform a generation of a digital output signal which can be output by the first interface of the connection device and forwarded to the second interface of the radio-frequency device. Furthermore, the processing unit may additionally or alternatively receive a radio frequency signal output by the radio-frequency device at the second interface and received by the connection device at a first interface. In particular, test received signal may be an analogue signal which can be converted to a digital signal by an analogue to digital converter. In particular such an analogue to digital converter may be comprised by the processing unit of the connection device.

The processing unit of the connection device may comprise hardware elements, like e.g. a processor. However, the processing unit may also be software implemented at least in part. Instructions may therefore be stored in a memory that is coupled to a general purpose processor, e.g. via a memory bus. The processor may further execute an operating system that loads and executes the instructions. The processor may e.g. be an Intel processor that runs a Windows or Linux operating system that loads and executes the instructions. In another embodiment, the processor may be a processor of a device that may e.g. run an embedded operating system that loads and executes the instructions.

The radio-frequency device may comprise any kind of appropriate element for outputting, in particular emitting, radio-frequency signals and/or receiving a radio frequency signals.

In particular, the radio-frequency device may comprise hardware elements such as filters, attenuators, amplifiers, signal shaping devices, mixers, an antennas or the like. However, it is understood, that any other kind of hardware elements, in particular analogue hardware elements for handling radio-frequency signals may be also possible.

The generated or measured radio-frequency signals may be used, for example, for testing a wireless device. For example, the radio-frequency signals may relate to radio-frequency signals of a mobile communication device, a global navigation system or the like. In particular, it is possible to adapt the generation or measurement of multiple radio frequency signals by simple replacing the radio frequency device.

Further embodiments of the present invention are subject of the further subclaims and of the following description, referring to the drawings.

In a possible embodiment, the connection device is controlled by the radio-frequency device based on control data sent from the second interface of the radio frequency device to the first interface of the connection device Accordingly, each radio-frequency device that may control the operation of a connection device may be connected to the connection device. For this purpose, the connection between the first interface of the connection device and the second interface of the radio-frequency device may be used for a communication between the connection device and the radio-frequency device. In this way, the radio-frequency device may send any kind of data to the connection device for configuring or controlling the operation of the connection device. In this way, the operation of the connection device may be adapted accordingly depending on a connected radio-frequency device, respectively.

In a possible embodiment, the processing unit of the connection device is adapted to generate the digital output signal or the digital input signal based on a predetermined protocol.

For example, a common protocol may be used for controlling the operation of the connection device, in particular of the processing unit. The protocol may be, for example, a communication protocol or any other kind of appropriate sequence of signals. By using a common protocol by multiple radio-frequency devices for controlling a connected connection device, it is easily possible to control or a set up the related connection device accordingly.

For example, the radio-frequency device may send control data of the configuration data to the connection device, once upon connecting the radio-frequency device to the connection device. Additionally or alternatively, it may be also possible to send configuration or control the data from the radio-frequency device to the communication device during operation of the devices, i.e. when the measurement system performs an operation like testing a device under test.

In an embodiment, the first interface of connection device is electrically and mechanically coupled with the second interface of the radio-frequency device.

Accordingly, by an electrical and mechanical connection of the connection device and the radio-frequency device, the two components provide a common arrangement for emitting and/or receiving radio-frequency signals. In particular, the electrical connection may be used for exchanging signals between the connection device and the radio-frequency device. Furthermore, the mechanical connection provides a stable arrangement of the individual to devices. For example, the electrical connection may be performed by a number of two or more combinations of plugs and sockets. However, any other kind of interfacing elements for providing an electrical connection between the communication device and the radio-frequency device may be also possible. Furthermore, the mechanical connection may be also achieved by an appropriate plug-socket-arrangement. However, it may be also possible to use appropriate elements like springs, clamps or hooks, or any other mechanical element for mechanically connecting the connection device and the radio-frequency device.

In particular, the connection between the connection device and the radio-frequency device may be a detachable connection. In this way, the connection device and the radio-frequency device may be separated and another radio-frequency device may be connected with the connection device. Hence, the test arrangement may be easily modified by simply replacing the radio-frequency device by another radio-frequency device.

In a possible embodiment, the connection device is arranged at a fixed predetermined spatial position with respect to the radio-frequency device.

Accordingly, by maintaining the same spatial relationship between the connection device and the radio-frequency device, the same mechanical arrangement of the components can be achieved, even by replacing a radio-frequency device by another radio-frequency device. In particular, the spatial relationship between the connection device and the radio-frequency device can be achieved, for example, by an appropriate mechanical configuration, for example a mechanical connection as already described above.

In a possible embodiment, the radio-frequency device is adapted to supply electrical power to the connection device.

For example, the electrical connection between the first interface of the connection device and the second interface of the radio-frequency device may provide additional connectors for providing a power supply from the radio-frequency device to the connection device. In particular, it may be possible to provide a direct current power supply with number of one or more predetermined voltages. However, any other kind of power supply may also possible. Accordingly, there is no need for a separate, additional power supply of the connection device. Moreover, only a single power supply, namely the power supply of the radio-frequency device, may be used for powering the whole measurement system.

In a possible embodiment, the connection device is adapted to generate the digital output signal based on a trigger event provided by the radio-frequency device.

For example, the radio-frequency device may send any kind of appropriate signal for triggering, i.e. initiating, the operation of the related connection device. The triggering may be initiated, for example, by a predetermined voltage level of a signaling line, a rising or falling edge of the signal, a predetermined command or any other kind of signal for triggering an operation of the connection device. Upon receiving such a trigger signal, the connection device may start performing a predetermined operation, for example generating a digital output signal or receiving an input signal from the radio-frequency device.

In a possible embodiment, the connection device comprises a memory for storing signal information data. In particular, the processing unit may be adapted to generate the digital output signal based on the stored signal information data.

The memory may be any kind of appropriate digital memory. In particular, the memory may be included in the processing unit or may be a memory separate from the processing unit. For example, predetermined data for generating a digital output signal may be stored in the memory. The data may comprise, for example, commands which can be executed by the processing device in order to generate the desired output signals. Furthermore, the data may comprise values, for example, in form of a look up table, which can be read by the processing unit in order to provide a desired output signal. Furthermore, the memory may be also used for storing further configuration data of the connection device, in particular the processing unit and/or for storing data related to input signals received by the first interface from the radio-frequency device.

In a possible embodiment, the connection device comprises a signal shaping device for adapting a waveform of the digital output signal.

For example, the signal shaping device may be configured to adapt the waveform of the digital signal data provided by the communication device. In this way, it is possible to achieve a predetermined waveform for the radio-frequency signals, in particular the radio-frequency signals output by the radio-frequency device. For this purpose, the signal shaping device may be any kind of components which are appropriate for adapting/shaping the waveform of a radio frequency signal, for example resistors, capacitors, inductors, filter elements or the like. However, it may be also possible to adapt the waveform of the signals by an appropriate processing of the digital data in the processing unit of the connection device.

In a possible embodiment, the connection device, in particular the processing unit of the connection device comprises a field-programmable gate array.

By using a field-programmable gate array (FPGA), the operation of connection device, in particular the processing unit can be easily configured and adapted by providing appropriate configuration data or instructions for the FPGA.

In a possible embodiment, the connection device comprises a communication interface for receiving digital data from the communication network or transmitting digital data to the communication network.

Accordingly, the connection device may be provided with appropriate data for signal generation by a further device through the communication network. Additionally or alternatively, the connection device may provide data relating to a received radio frequency signal to the communication network. The communication network may be any kind of network, for example an Ethernet network or a bus system.

For example, an additional device may generate digital data and provide the generated digital data to the connection device. Based on the digital data provided from the additional device, the connection device, in particular the processing unit of the connection device, may generate the digital output signal and provide the generated digital output signal to the connected radio-frequency device. In this way, the additional device may control the output of the radio-frequency device. Additionally or alternatively, the connection device may receive an input signal of the radio-frequency device and provide the digital data to the additional device, wherein the data provided to the additional device relates to the received input signal from the radio-frequency device. In this way, the additional device may evaluate the digital data, and the additional device may perform a processing of data relating to the radio-frequency signals received by the radio-frequency device.

For example, the additional device may be a device for processing a baseband signal. Hence, the additional device may provide digital data relating to a baseband signal and based on the data, the radio-frequency device may output a radio frequency signal comprising the baseband signal. Additionally or alternatively, the additional device may receive digital data relating to a baseband signal comprising a radio-frequency signals received by the radio-frequency device. In particular, the digital data may relate to an in-phase and a quadrature component of a baseband signal.

For generating the digital baseband data, any appropriate processing device may be used. For example, the processing device may be a personal computer, an embedded computing system, or any other appropriate computing device. Furthermore, the baseband processing device may be also realized by a cloud computing system or the like.

For example the digital data relating to the baseband may be generated by a baseband processing device connected to a connection device. The baseband processing device may generate digital data relating to a desired baseband signal. For example, the digital baseband data may be generated based on a predetermined modulation of a baseband the signal. Especially, the baseband processing device may obtain the data or a data stream which should be included in a radio frequency signal. For this purpose, the baseband processing device may comprise an input interface, in particular a digital interface, for receiving data to be included in the radio frequency signal. For example, the baseband processing device may apply a modulation of the baseband the signal for including the received data in the baseband of the radio frequency signal. In a possible embodiment, the modulation may comprise a quadrature amplitude modulation (QAM). In this case, the digital baseband data may relate to a modulation of the baseband a signal comprising an in-phase component and a quadrature component. However, it is understood, that any other modulation of the baseband signal may be also possible. Furthermore, the desired baseband signal may be any other kind of a signal which should be included in the radio frequency signal.

The digital baseband data may be any kind of digital data which are appropriate for generating a desired baseband the signal and/or a desired radio frequency signal comprising the baseband signal. For example, the digital baseband data may be provided to the connection device by data packets, wherein the data packets may have a predetermined fixed size or a variable size. Furthermore, the digital baseband data may be also provided to the connection device in a continuous data stream.

The baseband processing device may comprise hardware elements, like e.g. a processor. However, the baseband processing device may also be software implemented at least in part. Instructions may therefore be stored in a memory that is coupled to a general purpose processor, e.g. via a memory bus. The processor may further execute an operating system that loads and executes the instructions. The processor may e.g. be an Intel processor that runs a Windows or Linux operating system that loads and executes the instructions. In another embodiment, the processor may be a processor of a device that may e.g. run an embedded operating system that loads and executes the instructions.

In a possible embodiment, the radio frequency device comprises an amplitude adjustment device for controlling an amplitude of the output radio frequency signal or the measured radio frequency signal.

For example, the amplitude of radio frequency signal may be adapted by an attenuator and/or an amplifier. However, any other appropriate device for adapting the amplitude of a radio frequency signal may be also possible. In particular, it may be possible to adjust the amplitude of the radio frequency signal emitted by the radio-frequency device. Furthermore, it may be also possible to adjust an amplitude of radio-frequency signals received by the radio-frequency device, for example by an antenna of the radio-frequency device.

In a possible embodiment, the radio-frequency device comprises at least one of an antenna, a radio frequency mixer, an amplifier, an attenuator or a filter.

Furthermore, any other component for dealing with a radio frequency signal, in particular an analogue radio frequency signal, may be also possible. Accordingly, the radio-frequency device may perform appropriate modifications of a radio frequency signal, in particular the radio-frequency signals received from an external source, e.g. a device under test, or the digital radio-frequency signal provided from the connection device and received by the second interface of the radio-frequency device. In particular, the radio-frequency device may receive and/or emit the radio frequency signal by means of an appropriate antenna which may be included in the radio-frequency device or connected to the radio-frequency device by means of a connector or the like.

In a possible embodiment, the measurement system comprises a number of at least two connection devices. The number of at least two connection devices may be adapted to generate digital output signals relating to a multiple input multiple output signal.

Additionally or alternatively, radio-frequency signals from at least two multiple input multiple output elements may be received by a number of radio-frequency devices, and each of the radio-frequency devices may be connected with a related connection device.

For example, the measurements system may comprise a first connection device with a related first radio-frequency device related to a horizontal polarization, and a second connection device with a related second radio-frequency device which relates to a vertical polarization. However, it is understood, that the measurement system may comprise even more the two arrangements of connection devices and related radio-frequency devices.

In particular, it may be possible that all connection devices of a measurement system comprising multiple connection devices may be provided with digital data from a common source. As already described above, this common source may be a digital processing device which is connected to all of the number of connection devices. The number of connection devices may be connected with the digital processing device by means of a network or bus system. In particular, all connection devices may be connected with the digital processing device by means of a common network. Alternatively, each connection device may be connected with the digital processing device by a separate connection.

In a possible embodiment, the number of two or more connection devices may be located at different spatial positions. In this way, it is possible to achieve a measurement system comprising multiple different transmitters and/or receivers at different spatial positions. In this way, a system comprising distributed devices may be simulated.

With the present invention is therefore now possible to build up a measurement system which can be quick and easily adapted to multiple measurement purposes. Since the analogue and the digital part of the measurement system is separated. The analogue and the digital part are connected with each other by predetermined interfaces. Both, the analogue and digital part can be replaced independently. In particular, the digital part, i.e. the connection device, may remain unchanged even though another analogue component, i.e. another radio-frequency device, is connected. Hence, multiple radio-frequency devices may be provided which can be connected to one and the same connection device. In this way, the total costs for a flexible measurement system can be decreased. Furthermore, since one and the same connection device may be used for multiple radio-frequency devices, the total space, i.e. the volume, for storing all the components is less than the total space required for multiple independent components. In this way, a very flexible, cheap and efficient measurement system can be provided.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
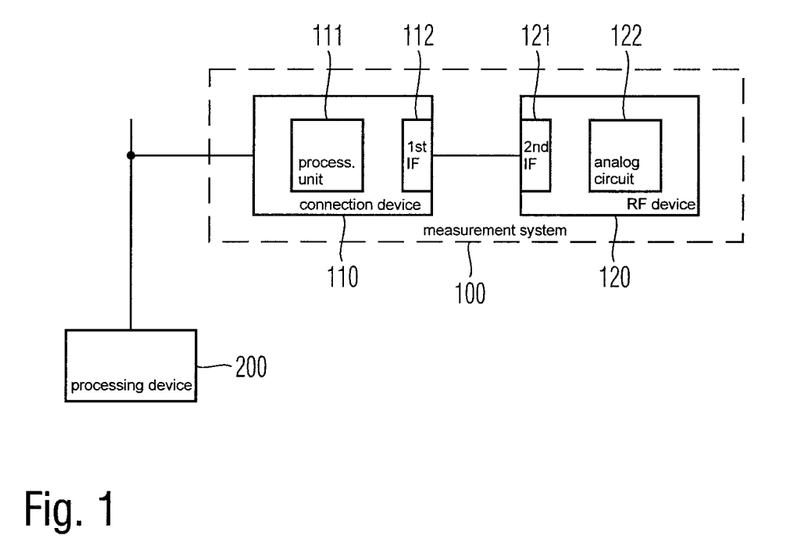
FIG. 1 shows a block diagram of an embodiment of a measurement system of the present invention.

FIG. 1 shows a block diagram of an embodiment of a measurement system 100. The measurement system 100 comprises a connection device 110 and a radio-frequency device 120. The connection device 110 may comprise a processing unit 111 and a first interface 112. The radio-frequency device 120 may comprise a second interface 121 and at least one analogue circuit 122. The first interface 112 of the connection device 110 may be directly coupled with the second interface 121 of the radio-frequency device 120. In other words, there is no additional element such as a cable or the like between the first interface 112 of the connection device 110 and the second interface 121 of the radio-frequency device 120. Accordingly, the connectors of the first interface 112 of the connection device 110 may match the connectors of the second interface 121 of the radio-frequency device 120. In this way, the connection device 110 and the radio-frequency device 120 can be electrically coupled with each other. Furthermore, the connectors of the first interface 112 and the corresponding connectors of the second interface 121 may also provide a mechanical coupling between the connection device 110 and the radio-frequency device 120. However, it may be also possible to provide additional elements, e.g. pins, hooks, springs or the like, for mechanically coupling the connection device 110 and the radio-frequency device 120. In this way, the connection device 110 and the radio-frequency device 120 can be electrically and mechanically coupled with each other. In particular, a detachable connection between the connection device 110 and the radio-frequency device 120 may be provided.

The connection between the first interface 112 of the connection device 110 and the second interface 121 of the radio-frequency interface may be used for providing a digital output signal of the connection device 110 to the radio-frequency device 120 and/or for providing an input data frequency signal from the data frequency device 120 to the connection device 110.

For example, the digital output signal may be generated by processing unit 111 of the connection device 110. The generated digital output signal may be provided to the first interface 111 of the connection device 110, and the first interface 111 of the connection device 110 may forward the digital output signal to the second interface 121 of the radio-frequency device 120. Furthermore, the second interface 121 of the radio-frequency device 120 may forward the received digital output signal to an analogue circuit 122 of the radio-frequency device 120. The analogue circuit 122 of the radio-frequency device 120 may comprise any kind of analogue circuits. For example, analogue circuit 122 may comprise an amplifier or attenuator for adapting an amplitude of a radio frequency signal, in particular an amplitude of the signal received by the second interface 121. Furthermore, analogue circuit 122 may also comprise a filter, e.g. a lowpass filter, a highpass or a bandpass filter for filtering a radio frequency signal, a mixer for mixing a radio frequency signal with a further radio frequency signal, e.g. mixing the digital output signal with a radio frequency signal of the predetermined frequency, or any other kind of analogue circuit. Furthermore, the analogue circuit 122 may comprise an antenna for emitting or receiving radio-frequency signals, or a connector for outputting a radio frequency signal. In particular, the connector may be connected with an external antenna or another device for receiving or emitting radio-frequency signals.

Furthermore, the radio-frequency device 120 may also receive radio-frequency signals by the analogue circuit 122 and provide a signal based on the received radio frequency signal. The second interface 121 of the radio-frequency device may forward this signal to the first interface 112 of the connection device 110 and the connection device 110 may receive the signal as a digital input signal. The received digital input signal may be further processed by the processing unit 111 of the connection device.

In this way, the measurement system 100 is separated into a digital part, namely the connection device 110, and an analogue part, namely the radio-frequency device 120. Since the connection device 110 and the radio-frequency device 112 are connected with each other by a detachable connection between the first interface 112 of the connection device 110 and the second interface 121 of the radio-frequency device 120, a first radio frequency device may be easily replaced by another, second radio-frequency device, wherein the same connection device 110 may be used. Furthermore, it may be also possible to replace a first connection device with another, second connection device while maintaining the same radio-frequency device 120. Hence, a modular and flexible configuration of the measurement system 100 can be achieved.

The connection device 110, in particular the processing unit 111 may perform any appropriate processing for generating a digital output signal and/or measuring the input signal received from the radio-frequency device 120. For example, the generation of the digital output signal may be performed based on predetermined parameters or settings stored in the connection device 110. For this purpose, connection device 110 may comprise a memory. The memory may be included in the processing unit 111 or the memory may be a separate device of the connection device 110. Furthermore, it is also possible to use predetermined algorithms or schemes for generating digital output signals. In another example, it may be possible to store data, e.g. in a lookup table, for specifying the digital output signal. However, it is understood that any other scheme for generating digital output signal may be also possible. Additionally or alternatively, it may be also possible to provide appropriate data for specifying how to deal with the input signal received from the radio-frequency device 110 by the first interface 112.

For example, the radio-frequency device 120 may provide the connection device 110 with appropriate data or specifications for configuring the connection device 110. For example, radio-frequency device 120 may send data to the connection device 110 upon the radio-frequency device 120 is connected to the connection device. However, it may be also possible that the radio-frequency device 120 may send data to the connection device 110 at any other time.

For a communication between the radio-frequency device of 120 and the connection device 110, the first interface 112 and the second interface 121 may comprise appropriate connectors for establishing a data communication between the radio-frequency device 120 and the connection device 110. For example, the communication may be established by a serial communication link or the like. In this way, any kind of data communication between the radio-frequency device 120 and the connection device 110 may be performed. The communication between the radio-frequency device 120 and the connection device 110 may be performed based on a predetermined communication protocol.

In a further example, connection device 110 may identify a connected radio-frequency device 120 after the radio-frequency device 120 is connected to the connection device 110. In this way, connection device 110 may be set up automatically based on the identification of a connected radio-frequency device 120. For this purpose, predetermined configuration data for a number of radio frequency devices 120 may be stored in a memory of connection device 110.

Furthermore, it may be also possible that the connection between the first interface 112 of the connection device 110 and the second interface 121 of the radio-frequency device 120 may provide a connection for a power supply. For example, radio-frequency device 120 may provide the required power for powering connection device 110. However, it may be also possible that radio-frequency device 120 is provided with the required power by connection device 110.

Connection device 110 may be further connected with any kind of further digital processing device. For example, connection device 110 may be connected with a digital processing device 200. The connection between the connection device 110 and the processing device 200 may be established by a communication network, for example and Ethernet network, or an appropriate bus. However, any other kind of communication link in particular a kind of wired or wireless communication link between the connection device 110 and the digital processing device 200 may be also possible. In this way, the connection device 110 may be provided with digital data. For example, the digital processing device 200 may provide any kind of data which may be used as a basis for generating the digital output signal generated by the connection device 110.

In a possible example, the digital processing device 200 may generate data of a baseband signal. The data of the baseband signal may be forwarded to the connection device 110, and connection device 110 may generate a digital output signal based on the provided baseband data. However, it is understood that any other kind of data may be also used as a basis for generating the digital output signal. Furthermore, it may be also possible that the connection device 110 may generate digital data based on the input signal received by the first interface 112 form in the radio-frequency device 120. In this case, connection device 110 may forward the generated digital data to the digital processing device 200. Digital processing device 200 may receive the digital data and perform any kind of further processing based on the received digital data. For example, the received data may be stored, analyzed, etc.

Figure 2:
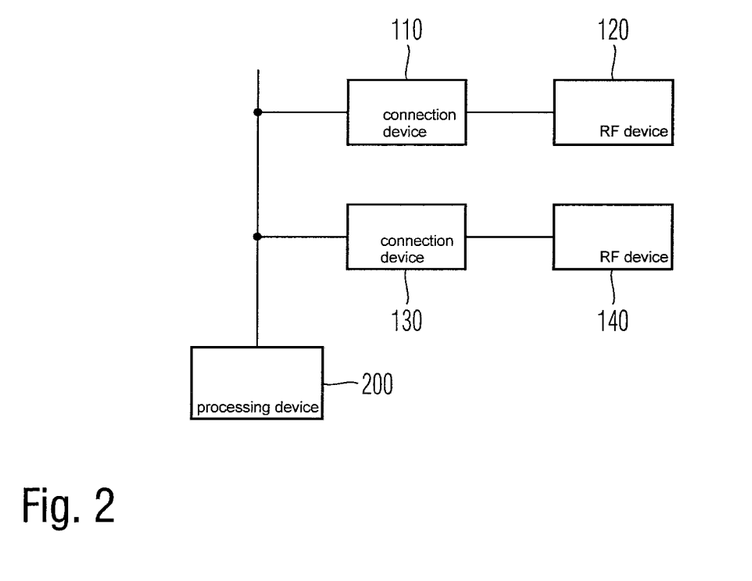
FIG. 2 shows a block diagram of another embodiment of a measurement system of the present invention.

FIG. 2 shows a further embodiment of a measurement system 100. The example in FIG. 2 comprises two connection devices 110, 130, wherein each connection device 110, 130 is connected with a radio-frequency device 120, 140. Even though only two combinations of connection devices 110, 130 and corresponding radio-frequency devices 120, 140 is shown in FIG. 2, the present invention is not limited to this. Furthermore, any number combination of a connection device 110, 130 and a related radio-frequency device 120, 140 may be possible.

When using number of more radio frequency devices 120, 140, each connected to a corresponding connection device 110, 130, it may be possible to configure a multiple input multiple output (MIMO) arrangement. In particular, each combination of a radio-frequency device 120, 140 may relate to one antenna or channel of a MIMO configuration. However, it may be also possible to use multiple radio-frequency devices 120, 140 and multiple connection devices 110, 130 for any other purposes. For example, it may be possible to simulate multiple spatial distributed transmission or reception of radio-frequency signals.

By connecting the connection devices 110, 130 with a common digital processing device 200, all connection devices 110, 130 may be synchronized and controlled together. In particular, all connection devices 110, 130 may be connected to the same communication network which may be further connected to the digital processing device 200. Alternatively, it may be also possible to use a separate communication links between the digital processing device 200 and each of the communication devices 110, 130.

For sake of clarity in the following description of the method based FIGS. 3 and 4 the reference signs used above in the description of apparatus based FIGS. 1 and 2 will be maintained.

Figure 3:
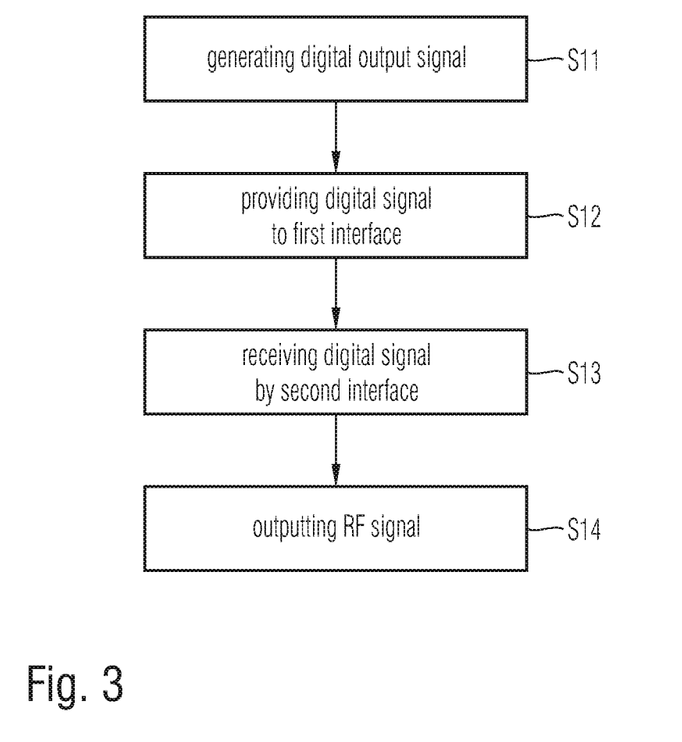
FIG. 3 shows a flow diagram of an embodiment of a measurement method of the present invention.

FIG. 3 shows a flow diagram of a measurement method according to an embodiment.

The measurement method comprises a step S11 for generating a digital output signal relating to a desired radio frequency signal. The generation may be performed by the processing unit 111 of a communication device 110. The method further comprises a step S12 for providing the generated digital output signal to a first interface 112 of the communication device 110, an a step S13 for receiving the digital output signal from the first interface 112 of the communication device 110 by a second interface 121 of a radio-frequency device 120. In particular, the second interface may be directly coupled with the first interface, i.e. no further cable is arranged between the first interface 112 and the second interface 121. Further, the method comprises a step S14 for outputting a radio frequency signal based on the received digital output data by the radio-frequency device 120. In particular, the radio frequency signal may be output to a connector of the radio-frequency device 120 or provided to an antenna included in the radio-frequency device 120.

Figure 4:
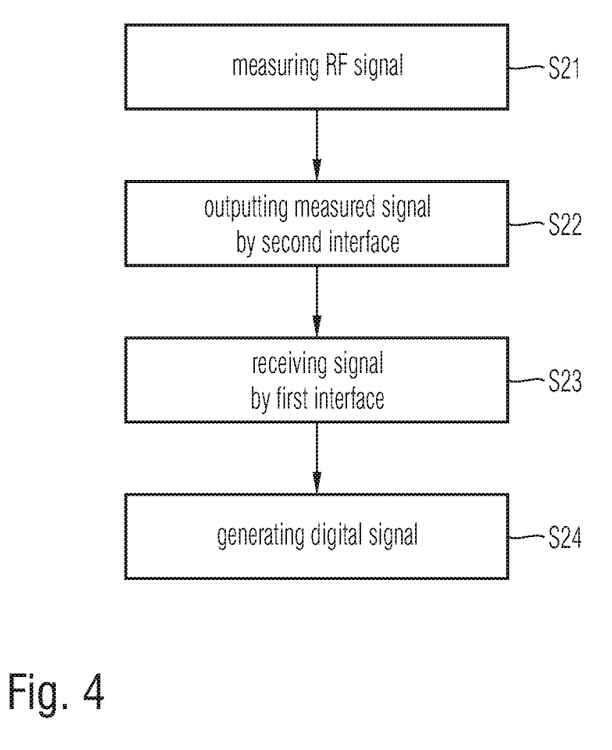
FIG. 4 shows a flow diagram of an embodiment of a measurement method of the present invention.

FIG. 4 shows a flow diagram of a measurement method according to another embodiment.

The measurement method comprises a step S21 measuring a radio-frequency measurement signal by a radio-frequency device 120, and a step S22 for outputting an analogue signal relating to the measured radio frequency measurement signal by a second interface 121 of the radio-frequency device 120. The method further comprises a step S23 for receiving the analogue signal by a first interface 112 of a connection device 110. In particular, the first interface 112 is directly connected to the second interface 121, i.e. there is no cable between the first interface 112 and the second interface 121. The method further comprises a step S24 for generating a digital input signal relating to the received analogue signal by a processing unit 121 of the connection device 120.

Summarizing, the present invention provides a modular and flexible measurement of radio-frequency signals. For this purpose, the measurement system is separated into a connection device performing digital operations and a radio-frequency signals comprising analogue circuits. The connection device and the radio-frequency device are coupled with each other by appropriate interfaces for exchanging signals, in particular digital signals between the communication device and the radio-frequency device.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A measurement system for measuring radio frequency signals, the measurement system comprising:
   a connection device including a first interface and a processing unit, wherein the processing unit is adapted to generate a digital output signal relating to a desired radio frequency signal and to provide the generated digital output signal to the first interface, or to generate a digital input signal relating to an analog input signal the received at the first interface; and
   a radio frequency device including a second interface for directly connecting with the first interface of the connection device, wherein the second interface is adapted to receive the digital output signal provided by the first interface of the connection device and to output a radio frequency signal based on the received digital output signal, or to measure a radio frequency measurement signal and to output an analog signal to the second interface, wherein the analog signal is forwarded to the first interface of the connection device as the analog input signal,
   wherein the connection device is controlled by the radio-frequency device based on control data sent from the second interface of the radio frequency device to the first interface of the connection device.

2. The measurement system according to claim 1, wherein the processing unit is adapted to generate the digital output signal or the digital input signal based on a predetermined protocol.

3. The measurement system according to claim 1, wherein the first interface of connection device is electrically and mechanically coupled with the second interface of the radio-frequency device.

4. The measurement system according to claim 1, wherein the connection device is arranged at a fixed predetermined spatial position with respect to the radio-frequency device.

5. The measurement system according to claim 1, wherein the radio-frequency device is adapted to supply electrical power to the connection device.

6. The measurement system according to claim 1, wherein the connection device is adapted to generate the digital output signal based on a trigger event provided by the radio-frequency device.

7. The measurement system according to claim 1, wherein the connection device comprises a memory for storing signal information data, and wherein the processing unit is adapted to generate the digital output signal based on the stored signal information data.

8. The measurement system according to claim 1, wherein the connection device comprises a signal shaping device for adapting a waveform of the digital output signal.

9. The measurement system according to claim 1, wherein the processing unit of the connection device comprises a field-programmable gate array.

10. The measurement system according to claim 1, wherein the connection device comprises a communication interface for receiving digital data from the communication network or transmitting digital data to the communication network.

11. The measurement system according to claim 10, wherein the received digital data comprise digital data relating to a baseband signal.

12. The measurement system according to claim 1, wherein the radio frequency device comprises an amplitude adjustment device for controlling an amplitude of the output radio frequency signal or the measured radio frequency signal.

13. The measurement system according to claim 1, wherein the radio-frequency device comprises at least one of an antenna, a radio frequency mixer, an amplifier, an attenuator or a filter.

14. The measurement system according to claim 1, wherein the measurement system comprises a number of at least two connection devices, and wherein the number of at least two connection devices it is adapted to generate digital output signals relating to a multiple input multiple output signal.

15. A measurement method for measuring radio frequency signals, comprising:

generating a digital output signal relating to a desired radio frequency signal by a processing unit of a communication device, providing the generated digital output signal to a first interface of the communication device;

receiving the digital output signal from the first interface of the communication device by a second interface of a radio-frequency device, wherein the second interface is directly coupled with the first interface;

outputting a radio frequency signal based on the received digital output data by the radio-frequency device; and controlling the connection device by the radio-frequency device based on control data sent from the second interface of the radio frequency device to the first interface of the connection device.

16. The measurement method according to claim 15, comprising generating the digital output signal based on a trigger event provided by the radio-frequency device.

17. The measurement method according to claim 15, comprising receiving digital data from a communication network or transmitting digital data to the communication network.

* * * * *